United States Patent
Wahler et al.

(10) Patent No.: US 6,196,728 B1
(45) Date of Patent: Mar. 6, 2001

(54) SOLID CAGE FOR ROLLER BEARINGS

(75) Inventors: Michael Wahler, Sennfeld; Alfred Weidinger, Oberwerrn, both of (DE)

(73) Assignee: SKF GmbH (DE)

( * ) Notice: Subject to any disclaimer, the term of this patent is extended or adjusted under 35 U.S.C. 154(b) by 0 days.

(21) Appl. No.: 09/197,621

(22) Filed: Nov. 23, 1998

(30) Foreign Application Priority Data

Nov. 22, 1997 (DE) .......................................... 297 20 767 U

(51) Int. Cl.⁷ ...................................................... F16C 33/46
(52) U.S. Cl. .............................................................. 384/580
(58) Field of Search .................................... 384/572, 576, 384/580, 577

(56) References Cited

U.S. PATENT DOCUMENTS 2,327,237  8/1943  Baden .
4,629,339  12/1986  Morinaga .
5,214,850  6/1993  Motohashi et al. .

*Primary Examiner*—Lenard A. Footland
(74) *Attorney, Agent, or Firm*—Eugene E. Renz, Jr., PC

(57) ABSTRACT

A solid cage for roller bearings, where the pitch circle of the rollers is between the radial center of the cage and its bore, with guide surfaces on the webs which conform to the lateral surface of the rollers, thus forming retaining edges in the area of the bore, across which the rollers are snapped into the pockets, characterized in that the guide surface 4 is interrupted by at least one strip 10, which curves to form an arc facing the roller 3, this strip being recessed into the guide surface 4 in the radially outward area of the cage, but projecting beyond the guide surface 4 in the radially inward area to serve as an additional retaining projection 12 for the roller 3.

2 Claims, 2 Drawing Sheets

SOLID CAGE FOR ROLLER BEARINGS

BACKGROUND OF THE INVENTION

It is already known from U.S. Pat. No. 2,327,237 that the guide surfaces on the webs of a cage can be made concave to fit the lateral surface of the roller. The radially inward and outward edge areas of the webs thus wrap around part of the roller and form a positive interlock which holds the roller in position. The degree of positive engagement depends on the radial position of the roller in the cage, that is, on the position of the pitch circle of the rollers with respect to the outside lateral surface of the cage and its bore. In addition, there must be at least one circumferential area where the edges of the webs wrap only slightly around the roller, so that it is possible to insert the rollers into the cage or so that, by taking advantage of the elasticity of the cage, the rollers can be snapped into place. For the sake of good lubrication, the guide surfaces themselves are optimized with respect to their curvature and the gap between them and the lateral surface of the roller. To make sure that the lubricant is properly distributed, the edge areas should not scrape the lubricant off the roller when the cage sags. This is not guaranteed in the known cage.

SUMMARY OF THE INVENTION

According to the invention, therefore, the task of the invention is to improve the solid cage cited above in such a way that, while ensuring good lubricant distribution and minimizing the sag of the cage, almost no lubricant is scraped off the roller.

The task is accomplished in that the guide surface is interrupted by at least one strip-like section, which is curved to form an arc facing the roller. In the radially outward area of the cage, this strip is recessed into the guide surface, whereas, in the radially inward area, it projects outward beyond the guide surface to serve as an additional retaining projection for the roller.

The guide surface in this case is designed to fit the curvature of the roller almost completely and thus is designed for optimum lubrication. Under certain operating conditions, the cage would in this case sag or shift out of center to such an extent that its upper areas of the webs and the edge areas on the outside lateral surface would rest on the rollers. Lubricant would thus be scraped off. To prevent this, the invention creates a radially inward-pointing, auxiliary retaining projection, which, when the cage sags, rests with a relatively narrow footprint on the lateral surface of the roller and greatly reduces the sag of the cage. The arc-shaped section of strip found in this position also forms a V-shaped lubricant groove in the web, which improves the lubrication at this location.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
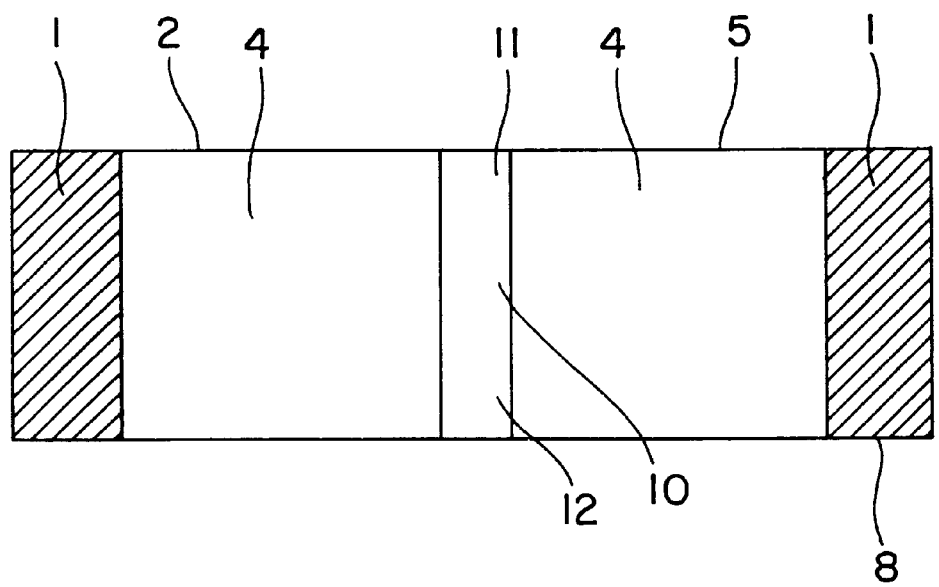
FIG. 1 shows a partial, longitudinal section through a solid cage for cylindrical roller bearings with projections for limiting the amount of sag.

Referring now to the drawings and particularly to FIG. 1, thereof, the solid cage shown in the figures consists of two side rings 1 having a plurality of circumferentially spaced webs 2 defining pockets P for cylindrical rollers 3.

The side surfaces 2a of the webs 2 are designed to be cylindrically concave so that they conform to the shape of rollers 3 and can thus serve as guide surfaces 4. Between rollers 3 and guide surfaces 4 there is a gap 6 for the transport of lubricant. Because pitch circle 7 of rollers 3 lies between the radial center of webs 2 and bore 8 of the cage, pronounced retaining sections 9, which wrap around part of roller 3, are obtained in the area of lateral surface 5, whereas the corresponding sections in the area of bore 8 are far less effective.

Figure 2:
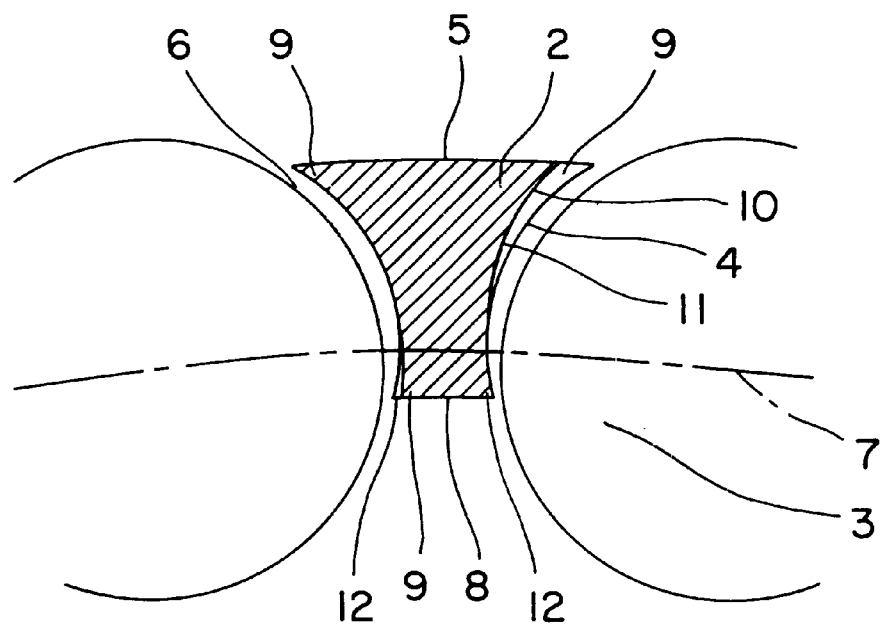
FIG. 2 shows a partial section along lines A—A and B—B of FIG. 1.

In the axial center of webs 2, an arc-shaped strip area 10 is provided on each guide surface 4. This strip 10 is designed as a groove 11, which becomes deeper as it proceeds toward lateral surface 5, but becomes higher as it proceeds out of bore surface 4 in the direction of bore 8. As a result, additional retaining projections 12 are obtained on the two guide surfaces 4 of a web 2. These projections 12 extend closer to the rollers 3. They reduce the radial mobility of roller 3 in the cage or, conversely, the cage is limited in the amount of play it has in the radial direction. In FIG. 2, furthermore, the left side of web 2 shows the cross section along line A—A of FIG. 1, whereas the right side of the web shows the cross section along line B—B. Accordingly, it can be clearly seen on the left how additional retaining projection 12 projects beyond original guide surface 4, whereas, on the right, the cross section passes through this projection. On the right, furthermore, groove 11 can be seen, which becomes deeper as it proceeds toward lateral surface 5.

Figure 3:
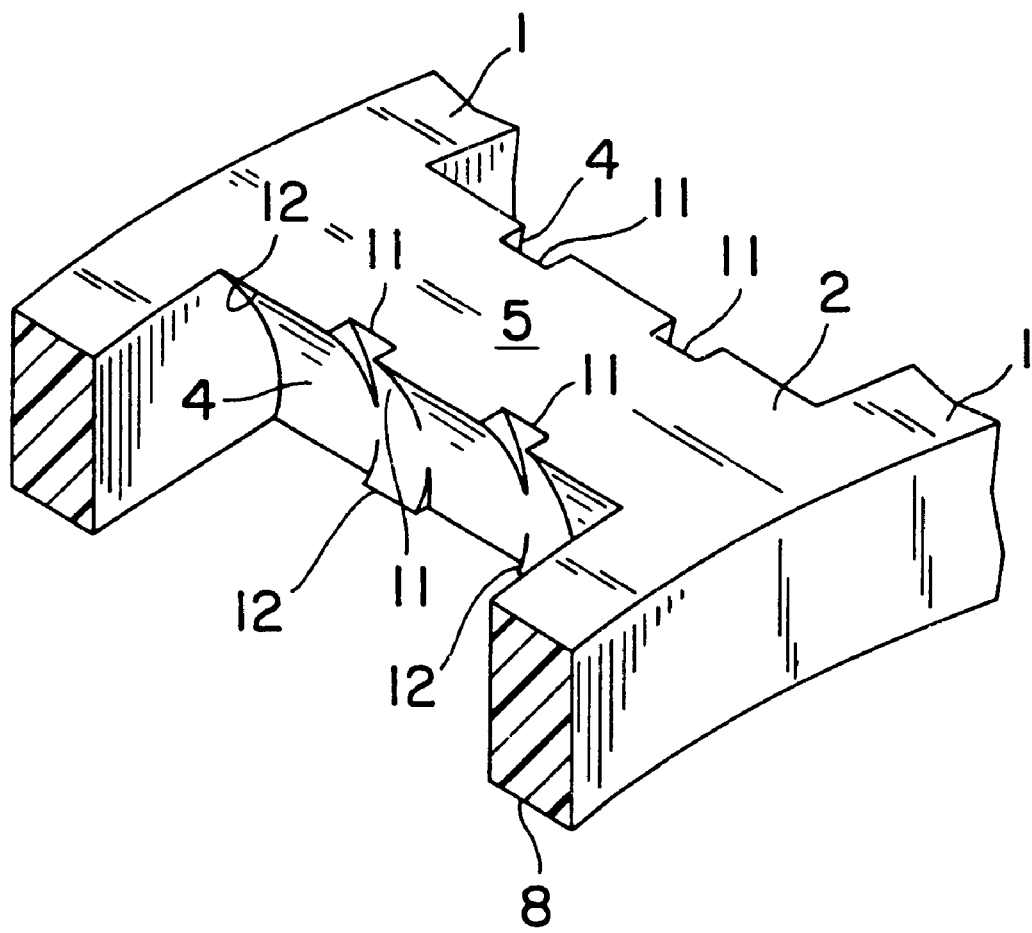
FIG. 3 is a fragmentary isometric view showing a portion of a solid cage whose webs are provided with arc-shaped grooves and projections.

In contrast to the example described, it is also possible to provide two or more strip area 10, which would be distributed in and on the guide surfaces (see FIG. 3).

Even though particular embodiments of the present invention have been illustrated and described herein, it is not intended to limit the invention and changes and modifications may be made therein within the scope of the following claims.

What is claim is:

1. A solid cage for roller bearings having a plurality of circumferentially spaced webs defining pockets for rollers and wherein the pitch circle (7) of the rollers (3) is between the radial center of the cage and its bore (8), guide surfaces (4) on the webs (2) which conform to the lateral surface of the rollers (3), thus forming retaining edges in the area of the bore (8), across which the rollers are snapped into the pockets, characterized in that the guide surface (4) is interrupted by at least one groove (11), recessed into the guide surface (4) in the radially outward area of the cage outboard of the pitch circle (7) and a projection (12) extending beyond the guide surface (4) in the radially inward area of the cage inboard of the pitch circle (7) to serve as an additional retaining projection (12) for the rollers (3).

2. Solid cage according to claim 1, characterized in that the surface of the strip (10) cooperates with the opposite lateral surface (5) of the roller (3) to form an essentially V-shaped pocket.

* * * * *